(12) United States Patent
Vedage et al.

(10) Patent No.: US 7,993,751 B2
(45) Date of Patent: Aug. 9, 2011

(54) ALKYLATED AMINOPROPYLATED METHYLENE-DI-(CYCLOHEXYLAMINE) AND USES THEREOF

(75) Inventors: Gamini Ananda Vedage, Bethlehem, PA (US); Williams Rene Raymond, New Tripoli, PA (US); Maw Lin Foo, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 257 days.

(21) Appl. No.: 12/186,607

(22) Filed: Aug. 6, 2008

(65) Prior Publication Data

US 2009/0018278 A1  Jan. 15, 2009

Related U.S. Application Data

(63) Continuation-in-part of application No. 11/672,298, filed on Feb. 7, 2007.

(51) Int. Cl.
| | |
|---|---|
| B32B 27/28 | (2006.01) |
| C08G 59/50 | (2006.01) |
| C08G 73/02 | (2006.01) |
| C08L 63/00 | (2006.01) |
| C08L 79/02 | (2006.01) |

(52) U.S. Cl. ........ 428/413; 428/416; 428/418; 523/414; 523/416; 523/417; 523/420; 528/106; 528/107; 528/119; 528/120; 528/121; 528/122; 528/123; 528/418; 528/421; 528/422

(58) Field of Classification Search .................. 528/106, 528/107, 119, 120, 121, 122, 123, 124, 418, 528/421, 422; 525/523, 524, 525, 526; 523/402, 523/403, 404, 414, 416, 417, 420; 428/413, 428/414, 415, 416, 417, 418

See application file for complete search history.

(56) References Cited

U.S. PATENT DOCUMENTS

| | | | |
|---|---|---|---|
| 2,813,773 A * | 11/1957 | Eisele et al. .................. 8/603 |
| 2,921,037 A | 1/1960 | Karlheinz et al. | |
| 3,321,438 A | 5/1967 | Brooker et al. | |
| 3,519,582 A | 7/1970 | Clelford et al. | |
| 5,059,391 A | 10/1991 | Botta et al. | |
| 5,280,091 A | 1/1994 | Dubowik et al. | |
| 5,739,209 A | 4/1998 | Lassila et al. | |
| 6,573,357 B1 * | 6/2003 | Ye et al. .................. 528/229 |
| 2006/0194062 A1 | 8/2006 | Setiabudi et al. | |
| 2009/0023846 A1 | 1/2009 | Vedage et al. | |
| 2009/0030125 A1 | 1/2009 | Vedage et al. | |
| 2009/0030159 A1 | 1/2009 | Vedage et al. | |

FOREIGN PATENT DOCUMENTS

| | | |
|---|---|---|
| DE | 24 60 305 A1 | 7/1976 |
| EP | 0 644 215 A | 3/1995 |
| EP | 0 737 702 A2 | 10/1996 |
| EP | 0 767 189 A2 | 4/1997 |
| EP | 1 433 775 A2 | 6/2004 |
| EP | 1956034 A1 | 8/2008 |
| FR | 901 921 A | 8/1945 |
| GB | 1 410 111 | 10/1975 |
| GB | 2 015 000 A | 9/1979 |
| WO | 2004/049776 A2 | 6/2004 |

OTHER PUBLICATIONS

Bernardo, M. Alexandra, et al., Thermodynamic and Steady-State Fluorescence Emission Studies on Metal Complexes of Receptors Containing Benzene Subunits, Inorganic Chemistry, 1998, pp. 3935-3942, vol. 37 (16), American Chemical Society.

Bernardo, M. Alexandra, et al., Thermodynamic, NMR and Photochemical Study on the Acid-Base Behaviour of N,N'-dibenzylated Polyamines and on Their Interaction With Hexacyanocobaltate(III), Journal of the Chemical Society, Perkin Transactions 2: Physical Organic Chemistry, 1996, pp. 2335-2342, vol. 11, Royal Society of Chemistry.

Rehse, Klaus et al., Alkyl-und Arylalkylderivate von Putrescin, Spermidin and Spermin, Archiv der Pharmazie, 1990, pp. 287-294, vol, 3235, Weinheim.

Tanaka, Y., Synthesis and Characteristics of Epoxides, C. A., May ed., Epoxy Resins Chemistry and Technology, pp. 213-233, Marcel Dekker, 1988.

* cited by examiner

*Primary Examiner* — Michael J Feely

(74) *Attorney, Agent, or Firm* — Michael K. Boyer

(57) ABSTRACT

The present invention provides epoxy curing agent compositions comprising alkylated aminopropylated methylene-di-(cyclohexylamine) compounds. Amine-epoxy compositions and articles produced from these amine-epoxy compositions are also disclosed.

23 Claims, No Drawings

ALKYLATED AMINOPROPYLATED METHYLENE-DI-(CYCLOHEXYLAMINE) AND USES THEREOF

CROSS-REFERENCE TO RELATED APPLICATIONS

This application is a continuation-in-part of application Ser. No. 11/672,298 filed 7 Feb. 2007, the disclosure of which is incorporated by reference herein.

BACKGROUND OF THE INVENTION

The present invention relates generally to alkylated aminopropylated alkylenediamine compounds, curing agent and amine-epoxy compositions derived from such compounds, and articles produced from such compounds and/or compositions.

The uses of epoxy resins which are cured, hardened, and/or crosslinked with amine-based curing agents are well known. These amine-epoxy materials are widely used in applications ranging from coatings, adhesives, and composites, to construction products for concrete, cementitious or ceramic substrates, often referred to as civil engineering applications such as formulations for concrete flooring.

When epoxy resins are cured with most pure non aromatic amine, the miscibility of these amines with the epoxy resins is not always good and some ripening time might be necessary before a clear mixture can be obtained.

In the case of a clear coat a ripening time may be applied to achieve a coating with high gloss and clarity. Ripening time or incubation time or induction time is defined as the time between mixing epoxy resin with amine and applying the product onto the target substrate. It could also be defined as the time required for the mix to become clear.

In order to overcome these problems the amines have been adducted with monoglycidyl ethers particularly the phenyl glycidyl ether or the o-cresyl glycidyl ether. These reactions are very advantageous to lower the vapor pressure and improve the miscibility of the amine to the resin, unfortunately this adduction tends to increase the viscosity to a very high level which can hinder the application of the product. This type of adduction might also require the removal of the free amine. Should the adduction be carried out far enough to remove all free amine the viscosity would become much too high and in some cases the product would even be solid. This type of adduction is also limited as each molecule used per molecule amine will remove a reactive site, which can diminish the cross-linking density of the systems particularly with amines having only four or less reactive sites.

There are numerous amine-based curing agent and amine-epoxy compositions that are employed in the amine-epoxy coating industry; however, none of these known products completely addresses the needs or solves the problems noted above. Accordingly, it is to this end that the present invention is directed.

BRIEF SUMMARY OF THE INVENTION

The present invention discloses curing agent compositions and methods of making such compositions. These curing agent compositions can be used to cure, harden, and/or crosslink an epoxy resin. The present invention comprises curing agent compositions comprising at least one alkylated aminopropylated methylene-di-(cyclohexylamine), also known as para-(aminocyclohexyl)methane, (PACM), which in one embodiment comprises the reaction product of the reductive amination of an aldehyde or ketone compound with an aminopropylated methylene-di-(cyclohexylamine) (AP-PACM), the alkylated APPACM having at least three active amine hydrogens and at least one alkyl group.

In another aspect, the present invention provides a curing agent composition comprising the contact product of
(i) at least one alkylated APPACM, e.g., the reaction product of the reductive amination of an aldehyde or ketone compound with an APPACM, the alkylated APPACM having at least three active amine hydrogens and at least one alkyl group; and
(ii) at least one multifunctional amine having three or more active amine hydrogens.

Generally, curing agent compositions of the present invention have an amine hydrogen equivalent weight (AHEW) based on 100% solids from about 30 to about 500.

The present invention, in yet another aspect, provides amine-epoxy compositions. For example, an amine-epoxy composition in accordance with the present invention comprises the reaction product of:
A) a curing agent composition comprising at least one alkylated APPACM, e.g., the reaction product of the reductive amination of an aldehyde or ketone compound with an APPACM, the alkylated APPACM having at least one alkyl group and at least three active amine hydrogens; and
B) an epoxy composition comprising at least one multifunctional epoxy resin.

As another aspect in accordance with the present invention an amine-epoxy composition comprises the reaction product of:
A) a curing agent composition comprising the contact product of:
(i) at least one alkylated APPACM, e.g., the reaction product of the reductive amination of an aldehyde or ketone compound with an APPACM, the alkylated APADA having at least one alkyl group and at least three active amine hydrogens; and
(ii) at least one multifunctional amine having three or more active amine hydrogens; and
B) an epoxy composition comprising at least one multifunctional epoxy resin.

In each aspect and embodiment of the invention the curing agent composition may comprise an alkylated APPACM component comprising polyamine molecules having one, or two, or three, or four aminopropyl groups, or any combination thereof. In each aspect and embodiment of the invention such alkylated APPACM component may comprise alkylated APPACMs having at least two aminopropyl groups, i.e., having two or more aminopropyl groups, especially those alkylated APPACMs having two aminopropyl groups.

In a particular embodiment of each of the above aspects the alkylated APPACM is an alkylated mono-(3-aminopropyl) PACM. In another particular embodiment of each of the above aspects the alkylated APPACM is an alkylated bis-(3-aminopropyl) PACM.

In all aspects and embodiments of the invention, the alkyl group is preferably C2-C21 alkyl, especially a C2-C11 alkyl group.

Articles of manufacture produced from amine-epoxy compositions disclosed herein include, but are not limited to, adhesives, coatings, primers, sealants, curing compounds, construction products, flooring products, and composite products. Further, such coatings, primers, sealants, or curing compounds can be applied to metal or cementitious substrates.

When the APPACM is alkylated, the resultant product has a better compatibility with epoxy resin, particularly with most common epoxy resins based on bisphenol A or bisphenol F as well as polyepoxy novolac resins. The mix of curing agent and epoxy resin often requires no "ripening time" for obtaining contact products with high gloss and clarity. Also smoking or fuming may be decreased or eliminated. Furthermore, the reaction products following reductive alkylation have a lower viscosity which allows alkylation to a point where no free amine is present in the final product. The removal of the free amine helps in reducing the carbamation of the film caused by the reaction of the primary amine in the presence of water and carbon dioxide. The decrease/absence of smoking or fuming; the improved compatibility with epoxy resin; the lower tendency to carbamate; the reduced need for an induction time and the low level of free, unreacted amine in the final product result in improved handling properties.

DEFINITIONS

The following definitions and abbreviations are provided in order to aid those skilled in the art in understanding the detailed description of the present invention.

AHEW—amine hydrogen equivalent weight
Am3—N-3-aminopropyl ethylenediamine
Am4—N,N'-bis(3-aminopropyl)ethylenediamine
Am5—N,N,N'-tris(3-aminopropyl)ethylenediamine
APPACM—aminopropylated methylene-di-(cyclohexylamine)
B-APPACM—bis-(3-aminopropyl)methylene-di-(cyclohexylamine)
D230—poly(alkylene oxide) from Huntsman Corp
DETA—diethylenetriamine,
DGEBA—diglycidyl ether of bisphenol-A, EEW 182-192
DER™ 331—Liquid DGEBA
EDA—ethylenediamine
EEW—epoxy equivalent weight
Epikote® 828 (Epon 828)—liquid epoxy resin with EEW approximately 184-192
IPDA—isophoronediamine, AHEW=43
M-APPACM—mono-(3-aminopropyl)methylene-di-(cyclohexylamine)
PACM—methylene-di-(cyclohexylamine)
PDA—propylenediamine
PEHA—pentaethylenehexamine
PHR—parts per hundred weight resin
TEPA—tetraethylenepentamine
TETA—triethylenetetramine, AHEW=25

DETAILED DESCRIPTION OF THE INVENTION

Amine Curing Agent and Epoxy-Amine Compositions

The present invention discloses curing agent compositions and methods of making these curing agent compositions. A curing agent composition in accordance with the present invention can be used to cure, harden, and/or crosslink an epoxy resin.

Such curing agent composition comprises an alkylated APPACM component comprising at least one alkylated APPACM, such as, the reductive amination product of an aldehyde or ketone compound with an APPACM. The preferred embodiment comprises an alkylated B-APPACM. The degree of alkylation depends on the equivalents ratio of aldehyde/ketone compound to reactive amine hydrogens in the APPACM in the reductive amination reaction. Thus, in one aspect of the invention, the curing agent composition comprises an alkylated APPACM component comprising polyamine molecules having one, or two, or three, or four or more alkyl groups, or any combination thereof. In another aspect such alkylated APPACM component for the present invention comprises at least 5 wt % alkylated APPACMs having at least two alkyl groups, i.e., having two or more alkyl groups. In other aspects of the invention the alkylated APPACM component comprises 10 to 100 wt %, especially 30 to 100 wt %, alkylated APPACMs having at least two alkyl groups. Generally, this curing agent composition has an amine hydrogen equivalent weight (AHEW) based on 100% solids from about 50 to about 500. In a different aspect, the curing agent composition has an AHEW based on 100% solids from about 60 to about 400, or from about 80 to about 300. Further, the curing agent composition can have an AHEW based on 100% solids from about 80 to about 200. In these aspects, the preferred embodiment comprises an alkylated B-APPACM composition.

In another aspect, the present invention provides a curing agent composition comprising the contact product of
  (i) an alkylated APPACM component comprising at least one alkylated APPACM, e.g., the reductive amination product of an aldehyde/ketone compound with an APPACM, the alkylated APPACM having at least one alkyl group and at least three active amine hydrogens; and
  (ii) at least one multifunctional amine having 3 or more active amine hydrogens.

Again in another embodiment of this aspect of the invention, the curing agent composition comprises an alkylated APPACM component comprising polyamine molecules having one, or two, or three, or four or more alkyl groups, or any combination thereof. In another aspect such alkylated APPACM component for the present invention comprises at least 5 wt % alkylated APPACMs having at least two alkyl groups, i.e., having two or more alkyl groups. In other aspects the alkylated APPACM component comprises 10 to 100 wt %, especially 30 to 100 wt %, alkylated APPACMs having at least two alkyl groups. The curing agent composition in this aspect of the present invention can have an AHEW based on 100% solids from about 50 to about 500. Further, such curing agent composition can have an AHEW based on 100% solids in the range from about 55 to about 450, from about 60 to about 400, from about 70 to about 350, from about 80 to about 300, or from about 90 to about 250. In a different aspect, the curing agent composition has an AHEW based on 100% solids from about 100 to about 200. In these aspects, the preferred embodiment comprises an alkylated B-APPACM composition.

If the multifunctional amine is different from the alkylated APPACM, AHEW can be calculated based on its chemical structure, or is often provided by the supplier of the amine in case of a mixture. The AHEW for the alkylated APPACM compound, AHEWB, is determined using the following formula, assuming the APPACM is the reductive amination product of x moles of aldehyde/ketone, for example, with 1 mole of an APPACM compound, PAPA (the APPACM compound and the aldehyde/ketone are discussed in greater detail below):

$$AHEW_B = \frac{MW_{PAPA} + x \cdot (MW_{Ald/Ket} - 16)}{f - x};$$

wherein:
$MW_{PAPA}$ is the average molecular weight of the APPACM;
$MW_{Ald/Ket}$ is the molecular weight of the aldehyde/ketone;
f is the average amine hydrogen functionality of the APPACM; and $MW_{APAPA}$ is the average molecular weight of the alkylated APPACM and can be calculated as follows:

$$MW_{APAPA} = MW_{PAPA} + x \cdot (MW_{Ald/Ket} - 16).$$

In each of the above aspects of the invention the curing agent composition comprises an alkylated APPACM component comprising polyamine molecules having one, or two, or three, or four or more alkyl groups, or any combination thereof. Such alkylated APPACM component for the present invention comprises at least 5 wt % alkylated APPACMs having two or more alkyl groups, preferably 10 to 100 wt %, especially 30 to 100 wt % APPACMs having two or more alkyl groups. In a preferred aspect of the present invention the alkylated APPACM component comprises an alkylated B-APPACM Additionally, curing agent compositions described herein can be solvent-based. Alternatively, in another aspect of the present invention, these compositions can further comprise at least one diluent, such as, for example, an organic solvent, or an organic or inorganic acid. Appropriate organic solvents are well known to those skilled in the art of amine formulation chemistry. Exemplary organic solvents suitable for use in the present invention include, but are not limited to, benzyl alcohol, butanol, toluene, xylene, methyl ethyl ketone, and the like, or combinations thereof. Non-limiting examples of organic and inorganic acids are acetic acid, sulfamic acid, lactic acid, salicylic acid, sebacic acid, boric acid, phosphoric acid, and the like, or combinations thereof. Such acids can increase the curing speed of the curing agent composition.

Curing agent compositions of the present invention can be produced with various reactant ratios of aldehyde/ketone compound to the APPACM compound.

In accordance with the present invention, a method of making a curing agent composition is provided. This method comprises either using the alkylated APPACM composition as a curing agent or formulating it with other amine curing agents, such as alkylated amines or non-alkylated amines, catalysts, accelerators, non-reactive diluents, solvents and other additives necessary to achieve the required properties of the final curing agent composition.

Curing agent compositions described herein can maintain single phase uniformity for extended periods of time, which can be required for storage of the product and its subsequent use in its intended application. Additionally, if these compositions are substantially free of solvents, they can have substantially no VOCs, which can be beneficial for environmental, health and safety issues, as will be appreciated by those skilled in the art.

The curing agent compositions also can be further modified with monofunctional epoxides, such as, for example, phenyl glycidyl ether, o-cresyl glycidyl ether, p-tert-butylphenyl glycidyl ether, n-butyl glycidyl ether, and other similar glycidyl ethers or esters. Further, curing agent compositions disclosed herein can be blended with other commercially available curing agents. Such commercially available curing agents include, but are not limited to, solvent based, solvent free or water-based curing agents, which can be employed in a blend to target specific properties, such as cure rate, drying speed, hardness development, clarity, and gloss.

The present invention also includes articles of manufacture comprising an amine-epoxy composition as described above. Such articles can include, but are not limited to, an adhesive, a coating, a primer, a sealant, a curing compound, a construction product, a flooring product, a composite product, laminate, potting compounds, grouts, fillers, cementitious grouts, or self-leveling flooring. Additional components or additives can be used together with the compositions of the present invention to produce articles of manufacture. Further, such coatings, primers, sealants, curing compounds or grouts can be applied to metal or cementitious substrates.

The relative amount chosen for the epoxy composition versus that of the curing agent composition, or hardener, can vary depending upon, for example, the end-use article, its desired properties, and the fabrication method and conditions used to produce the end-use article. For instance, in coating applications using certain amine-epoxy compositions, incorporating more epoxy resin relative to the amount of the curing agent composition can result in coatings which have increased drying time, but with increased hardness and improved appearance as measured by gloss. Amine-epoxy compositions of the present invention generally have stoichiometric ratios of epoxy groups in the epoxy composition to amine hydrogens in the curing agent composition ranging from about 1.5:1 to about 0.7:1. For example, such amine-epoxy compositions can have stoichiometric ratios of about 1.5:1, about 1.4:1, about 1.3:1, about 1.2:1, about 1.1:1, about 1:1, about 0.9:1, about 0.8:1, or about 0.7:1. In another aspect, the stoichiometric ratio ranges from about 1.3:1 to about 0.7:1. In yet another aspect, the stoichiometric ratio ranges from about 1.2:1 to about 0.8:1. In still another aspect, the stoichiometric ratio ranges from about 1.1:1 to about 0.9:1.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or formulations described herein. Still further, two or more of the components of the contact product may react to form other components composing the composition. Combining additional materials or components can be done by any method known to one of skill in the art.

Alkylated Aminopropylated PACM

Aminopropylated PACM (APPACM) includes, but is not limited to, N-(3-aminopropyl) PACM (M-APPACM); N,N'-bis(3-aminopropyl) PACM (B-APPACM); N,N-bis(3-aminopropyl) PACM; N,N,N'-tris(3-aminopropyl) PACM (T-APPACM); and N,N,N',N'-tetrakis(3-aminopropyl) PACM. Mixtures of APPACM compounds can be employed in the present invention so long as three or more active hydrogen equivalents are present in the mixture. If less than three active hydrogen equivalents are present in the mixture, it must be formulated with other multifunctional amines as described hereinafter.

The APPACM compounds are prepared by the Michael reaction of PACM with acrylonitrile, followed by hydrogenation over metal catalysts as is well known to those skilled in the art.

An APPACM component for use in the alkylation reaction comprises N,N'-bis(3-aminopropyl) PACM (B-APPACM). In another embodiment the APPACM component comprises 20-99 parts by weight (pbw) of N,N'-bis(3-aminopropyl) PACM (B-APPACM), desirably 75-95 pbw.

Mixtures composing the APEDA component can be prepared by the reaction sequence described above for making the APPACM without the need to conduct a distillation or other process of separation, except for the optional removal of low molecular weight side products of the reaction which are more volatile than M-APPACM. It will be recognized by those skilled in the art that small quantities of other products of hydrogenation may be present in the mixture.

In one aspect of the present invention, the at least one alkylated APADA comprises the reaction product of:
(i) at least one APPACM compound and
(ii) at least one aldehyde or ketone compound having the formula:

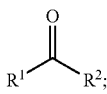

wherein:
$R^1$ is a C1 to C10 alkyl group;
$R^2$ is a hydrogen atom or a C1 to C10 alkyl group; or
$R^1$ and $R^2$ in combination with the carbon atom of the carbonyl moiety form a C5 to C6 cycloalkyl group.

Unless otherwise specified, alkyl groups described herein are intended to include all structural isomers, linear or branched, of a given moiety within this definition. As an example, unless otherwise specified, the term propyl is meant to include n-propyl and isopropyl, while the term butyl is meant to include n-butyl, isobutyl, t-butyl, sec-butyl, and so forth. For instance, non-limiting examples of octyl isomers include 2-ethyl hexyl and neooctyl.

Non-limiting examples of alkyl groups which can be present in the at least one aldehyde or ketone compound include, but are not limited to, methyl, ethyl, propyl, butyl, pentyl, hexyl, heptyl, octyl, nonyl, or decyl, and the like. Cycloalkyl groups include cyclopentyl and cyclohexyl.

In another aspect of the present invention, $R^1$ is a C3 to C6 alkyl group; $R^2$ is a hydrogen atom or a C3 to C6 alkyl group. In another aspect $R^1$ and $R^2$ in combination with the carbon atom of the carbonyl moiety form a cyclopentyl or cyclohexyl group, especially a cyclohexyl group.

In yet another aspect, $R^1$ and $R^2$ are selected independently from a methyl group, an ethyl group, a propyl group, a butyl group, a pentyl group, or a hexyl group. In a further aspect of the present invention, $R^1$ and $R^2$ are methyl groups.

Aldehyde or ketone compounds useful in the present invention include, but are not limited to, acetaldehyde (also known as ethanal), propanal, butanal, pentanal, 2-ethyl hexanal, acetone, methyl ethyl ketone, methyl propyl ketone, diethyl ketone, methyl butyl ketone, methyl isobutyl ketone, methyl amyl ketone, methyl hexyl ketone, cyclohexanone, methyl cyclohexanone, or any combination thereof. In a further aspect of the present invention, the at least one aldehyde or ketone compound is acetone, methyl ethyl ketone, methyl isobutyl ketone, cyclohexanone, or a combination thereof. In yet another aspect, the at least one aldehyde or ketone compound is acetaldehyde.

In one aspect of the present invention, the at least one alkylated APPACM comprises the reductive amination product of a C2-C11 aldehyde or ketone compound with an APPACM, especially with B-APPACM.

In accordance with the curing agent compositions and methods of making such compositions disclosed herein, the molar reactant ratio of the aldehyde/ketone compound to the at least one APPACM compound is in a range from about 0.8:1 to about 3.0:1. In another aspect, the molar reactant ratio is about 0.9:1, about 1:1, about 1.1:1, about 1.2:1, about 1.3:1, about 1.4:1, about 1.5:1, about 1.6:1, about 1.7:1, about 1.8:1, about 1.9:1, or about 2.0:1. In yet another aspect, the molar reactant ratio is in a range from about 0.9:1 to about 1.8:1, or from about 1:1 to about 1.6:1. In a further aspect, the molar reactant ratio of the aldehyde/ketone compound to the at least one APPACM compound is in a range from about 1.2:1 to about 1.5:1. In yet another aspect the product should retain more than two reactive amine hydrogens, to allow a proper cross-linking of the epoxy resin. Even at molar reactant ratios of the aldehyde/ketone compound to the at least one APPACM compound less than 1:1, dialkylated APPACMs are produced albeit in minor amounts. However to afford sufficient amounts of dialkylated APPACMs, molar reactant ratios of the aldehyde/ketone compound to the at least one APPACM compound of 1:1 to 2.2:1 should be used.

The alkylated APPACM of the present invention can be prepared by the reductive amination of at least one APPACM compound with the aldehyde/ketone compound. Procedures for the reductive amination of aldehyde/ketone are well known to those of skill in the art. Generally, these procedures involve condensing the aldehyde/ketone with the amine, then reducing the intermediate Schiff base. The reduction is typically conducted in the presence of a metal catalyst in a hydrogen-rich atmosphere at pressures above atmospheric pressure. A non-limiting example of the synthesis of alkylated APPACM in accordance with the present invention is illustrated in Example 1.

In another aspect of this invention, the at least one alkylated APPACM compound has the formula:

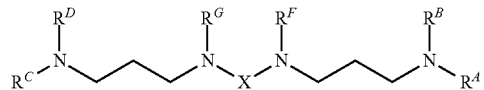

wherein $R^A$ is a C2-C11 alkyl group; $R^B$, $R^C$, $R^D$, $R^F$, and $R^G$ are independently $R^A$ or a hydrogen atom; X is a methylene-di-cyclohexyl group, provided that the alkylated APPACM has at least three active amine hydrogen atoms. In another aspect, $R^A$ and $R^C$ are preferably C3-C8 alkyl or C4-C7 alkyl, especially C3-C6 alkyl.

In yet another aspect of the present invention, the alkylated APPACM compound is of the above formula, wherein $R^A$ is C3-C8 alkyl or C4-C7 alkyl; $R^B$, $R^C$, $R^D$, $R^F$, and $R^G$ are hydrogen atoms, provided that the alkylated APPACM has at least three active amine hydrogen atoms. In a further aspect, $R^A$ and $R^C$ are C3-C6 alkyl and $R^B$, $R^D$, $R^F$, and $R^G$ are hydrogen atoms.

Given the many possible locations on the APPACM compound where the alkyl groups can replace a hydrogen atom, the product resulting from the reductive reaction of at least one APPACM compound and an aldehyde/ketone compound is necessarily a mixture of many different species, where some of the $R^B$, $R^C$, $R^D$, $R^F$, and $R^G$ groups are hydrogen and others are alkyl groups. Which and how many of the "R" groups are converted from hydrogen to alkyl groups depends on many factors, among those being the reaction conditions, catalyst selection, reactants ratio, choice of reactant (specific aldehyde/ketone compound), and the like. For example, using an aldehyde/ketone compound as the reactant in a molar reactant ratio of aldehyde/ketone to the APPACM compound of between about 1:1 to about 2:1, the major component of the reaction product is where $R^A$ is alkyl, $R^C$ is alkyl or a hydrogen atom, and $R^B$, $R^D$, $R^F$, and $R^G$ are hydrogen atoms. Using an aldehyde/ketone compound as the reactant in a molar reactant ratio of aldehyde/ketone to the APPACM compound of about 1.5:1 to about 2.1:1, the major component of the reaction product is where $R^A$ and $R^C$ are alkyl, and $R^B$, $R^D$, $R^F$, and $R^G$ are alkyl or hydrogen atoms.

Multifunctional Amine

Curing agent compositions in accordance with the present invention can comprise at least one multifunctional amine.

Multifunctional amine, as used herein, describes compounds with amine functionality and which contain three (3) or more active amine hydrogens.

Non-limiting examples of multifunctional amines that are within the scope of the present invention include, but are not limited to, an aliphatic amine, a cycloaliphatic amine, an aromatic amine, a poly(alkylene oxide) diamine or triamine, a Mannich base derivative of an aliphatic amine, a cycloaliphatic amine, or an aromatic amine, a polyamide derivative of an aliphatic amine, a cycloaliphatic amine, or an aromatic amine with a dimer fatty acid or a mixture of a dimer fatty acid and fatty acid, an amidoamine derivative of an aliphatic amine, a cycloaliphatic amine, or an aromatic amine with a fatty acid, an amine adduct derivative of an aliphatic amine, a cycloaliphatic amine, or an aromatic amine with a glycidyl ether of bisphenol A or bisphenol F or an epoxy novolac resin, and the like, or any combination thereof.

More than one multifunctional amine can be used in the compositions of the present invention. For example, the at least one multifunctional amine can comprise an aliphatic amine and a Mannich base derivative of a cycloaliphatic amine. Also, the at least one multifunctional amine can comprise one aliphatic amine and one different aliphatic amine.

Exemplary aliphatic amines include polyethyleneamines (EDA, DETA, TETA, TEPA, PEHA, and the like), polypropyleneamines, aminopropylated ethylenediamines (Am3, Am4, Am5, and the like), aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine, and the like, or combinations thereof. In one aspect of this invention, the at least one multifunctional amine is EDA, DETA, TETA, TEPA, PEHA, propylenediamine, dipropylenetriamine, tripropylenetetramine, Am3, Am4, Am5, N-3-aminopropyl-1,3-diaminopropane, N,N'-bis(3-aminopropyl)-1,3-diaminopropane, N,N,N'-tris(3-aminopropyl)-1,3-diaminopropane, or any combination thereof. Additionally, the poly(alkylene oxide) diamines and triamines commercially available under the Jeffamine trademark from Huntsman Corporation, are useful in the present invention. Illustrative examples include, but are not limited to, Jeffamine® D-230, Jeffamine® D-400, Jeffamine® D-2000, Jeffamine® D-4000, Jeffamine®T-403, Jeffamine®EDR-148, Jeffamine® EDR-192, Jeffamine®C-346, Jeffamine® ED-600, Jeffamine® ED-900, Jeffamine® ED-2001, and the like, or combinations thereof.

Cycloaliphatic and aromatic amines include, but are not limited to, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine (referred to commercially as 1,3-BAC), isophorone diamine, norbornane diamines, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and the like, or combinations thereof. The mixture of methylene bridged poly(cyclohexyl-aromatic)amines is abbreviated as either MBPCM or MPCA, and is described in U.S. Pat. No. 5,280,091, which is incorporated herein by reference in its entirety. In one aspect of the present invention, the at least one multifunctional amine is a mixture of methylene bridged poly(cyclohexyl-aromatic) amines (MPCA).

Mannich base derivatives can be made by the reaction of the above described aliphatic amines, cycloaliphatic amines, or aromatic amines with phenol or a substituted phenol and formaldehyde. An exemplary substituted phenol used to make Mannich bases with utility in the present invention is cardanol, which is obtained from cashew nut shell liquid. Alternatively, Mannich bases can be prepared by an exchange reaction of a multifunctional amine with a tertiary amine containing a Mannich base, such as tris-dimethylaminomethylphenol (commercially available as Ancamine® K54 from Air Products and Chemicals, Inc.) or bis-dimethylaminomethylphenol. Polyamide derivatives can be prepared by the reaction of an aliphatic amine, cycloaliphatic amine, or aromatic amine with dimer fatty acid, or mixtures of a dimer fatty acid and a fatty acid. Amidoamine derivatives can be prepared by the reaction of an aliphatic amine, cycloaliphatic amine, or aromatic amine with fatty acids. Amine adducts can be prepared by the reaction of an aliphatic amine, cycloaliphatic amine, or aromatic amine with an epoxy resin, for example, with the diglycidyl ether of bisphenol-A, the diglycidyl ether of bisphenol-F, or epoxy novolac resins. The aliphatic, cycloaliphatic, and aromatic amines also can be adducted with monofunctional epoxy resins, such as phenyl glycidyl ether, cresyl glycidyl ether, butyl glycidyl ether, other alkyl glycidyl ethers, and the like.

Multifunctional Epoxy Resin

Amine-epoxy compositions of the present invention comprise the reaction product of a curing agent composition and an epoxy composition comprising at least one multifunctional epoxy resin. Multifunctional epoxy resin, as used herein, describes compounds containing 2 or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference.

One class of epoxy resins suitable for use in the present invention comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl)propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present invention:

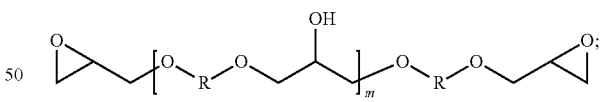

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present invention.

In another aspect, epoxy novolac resins, which are the glycidyl ethers of novolac resins, can be used as multifunctional epoxy resins in accordance with the present invention. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products ranges from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the prevent invention. In another aspect the multifunctional epoxy resin has an EEW in a range from about 170 to about 250.

Depending upon the end-use application, it can be beneficial to reduce the viscosity of the compositions of the present invention by modifying the epoxy component. For example, the viscosity can be reduced to allow an increase in the level of pigment in a formulation or composition while still permitting easy application, or to allow the use of a higher molecular weight epoxy resin. Thus, it is within the scope of the present invention for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof.

Miscellaneous Additives

Compositions of the present invention can be used to produce various articles of manufacture. Depending on the requirements during the manufacturing of or for the end-use application of the article, various additives can be employed in the formulations and compositions to tailor specific properties. These additives include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof. It is understood that other mixtures or materials that are known in the art can be included in the compositions or formulations and are within the scope of the present invention.

Articles

The present invention also is directed to articles of manufacture comprising the compositions disclosed herein. For example, an article can comprise an amine-epoxy composition which comprises the reaction product of a curing agent composition and an epoxy composition. The curing agent composition can comprise the contact product of at least one multifunctional amine having 3 or more active amine hydrogens and the alkylated APADA. The epoxy composition can comprise at least one multifunctional epoxy resin. Optionally, various additives can be present in the compositions or formulations used to produce fabricated articles, dependent upon the desired properties. These additives can include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof.

Articles in accordance with the present invention include, but are not limited to, a coating, an adhesive, a construction product, a flooring product, or a composite product. Coatings based on these amine-epoxy compositions can be solvent-free or can contain diluents, such as water or organic solvents, as needed for the particular application. Coatings can contain various types and levels of pigments for use in paint and primer applications. Amine-epoxy coating compositions comprise a layer having a thickness ranging from 40 to 400 µm (micrometer), preferably 80 to 300 µm, more preferably 100 to 250 µm, for use in a protective coating applied on to metal substrates.

In addition, for use in a flooring product or a construction product, coating compositions comprise a layer having a thickness ranging from 50 to 10,000 µm, depending on the type of product and the required end-properties. A coating product that delivers limited mechanical and chemical resistances comprises a layer having a thickness ranging from 50 to 500 µm, preferably 100 to 300 µm; whereas a coating product such as for example a self-leveling floor that delivers high mechanical and chemical resistances comprises a layer having a thickness ranging from 1,000 to 10,000 µm, preferably 1,500 to 5,000 µm.

Numerous substrates are suitable for the application of coatings of this invention with proper surface preparation, as is well known to one of ordinary skill in the art. Such substrates include, but are not limited to, concrete and various types of metals and alloys, such as steel and aluminum. Coatings of the present invention are suitable for the painting or coating of large metal objects or cementitious substrates including ships, bridges, industrial plants and equipment, and floors.

Coatings of this invention can be applied by any number of techniques including spray, brush, roller, paint mitt, and the like. In order to apply very high solids content or 100% solids coatings of this invention, plural component spray application equipment can be used, in which the amine and epoxy components are mixed in the lines leading to the spray gun, in the spray gun itself, or by mixing the two components together as they leave the spray gun. Using this technique can alleviate limitations with regard to the pot life of the formulation, which typically decreases as both the amine reactivity and the solids content increases. Heated plural component equipment can be employed to reduce the viscosity of the components, thereby improving ease of application.

Construction and flooring applications include compositions comprising the amine-epoxy compositions of the present invention in combination with concrete or other materials commonly used in the construction industry. Applications of compositions of the present invention include, but are not limited to, its use as a primer, a deep penetrating primer, a coating, a curing compound, and/or a sealant for new or old concrete, such as referenced in ASTM C309-97, which is incorporated herein by reference. As a primer or a sealant, the amine-epoxy compositions of the present invention can be applied to surfaces to improve adhesive bonding prior to the application of a coating. As it pertains to concrete and cementitious application, a coating is an agent used for application on a surface to create a protective or decorative layer or a coat. Crack injection and crack filling products also can be prepared from the compositions disclosed herein. Amine-epoxy compositions of the present invention can be mixed with cementitious materials such as concrete mix to form polymer or modified cements, tile grouts, and the like. Non-limiting examples of composite products or articles comprising amine-epoxy compositions disclosed herein include tennis rackets, skis, bike frames, airplane wings, glass fiber reinforced composites, and other molded products.

In a particular use of the invention these curing agent compositions will have applicability in making epoxy filament-wound tanks, infusion composites such as windmill blades, aerospace adhesives, industrial adhesives, as well as other related applications. A composite is a material made of different substances, and in the case of resin technologies, composites refer to resin impregnated systems where the resin is reinforced by the addition of reinforcing materials such as fillers and fibers for improving general properties of the resulting product. These materials work together but are not soluble in one another. In the present case, the binder component comprises the epoxy resin and epoxy curing agent(s). There are many types of composite applications such as prepegs, laminates, filament windings, braiding, pultrusion, wet lay up and infusion composites. Resin infusion, or resin transfer, is a process by which resin is introduced to the composite mold, the reinforcement material having already been placed into the mold and closed prior to resin introduction. There are variations on this process such as those that are vacuum assisted.

An advantage of the use of alkylated APPACM in amine-epoxy compositions for making composites is the longer pot life and improved compatibility versus the unmodified aliphatic polyamines like TETA. The short pot life of unmodified aliphatic polyamines like TETA make them barely workable for filament winding and infusion applications. Curing agents like TETA start to cure before the processing is completed, leading to poor wet out and dry spots that are failure points. TETA is used for hand lay-up composites where long pot life is not needed, but generally not for resin infusion. Using TETA for filament winding (pipes) is a very manual process with significant EH&S concerns (the TETA and epoxy resin is mixed, then the workers take cups of the mixture from a dispenser and manually pour them over the winding glass fibers and run their gloved hands along the pipe to run the liquid onto the winding pipe). With longer pot life the process can be automated with a bath.

The advantage in adhesives is again longer pot life, in this case so there is no skin-over before the parts are glued together, which is a major concern for large aircraft and windmill blades, when it takes a long time to place the adhesive beads across the entire part. Lower blush due to the alkyl group adds to the lower skin-over. The low viscosity allows for high filler levels. If the adhesive that is put on the part first starts to cure or starts to blush over before the last of the adhesive is dispensed on the part, when the two pieces are pressed together there will be a weaker bond with the first bead.

After heat cure the alkylated curing agents of the invention show good physical properties, comparable to amines like isophoronediamine (IPDA) which are used in composites for mechanical strength and compatibility with epoxy resin. However, these alkylated APPACM curing agents are lower Tg than IPDA so do not need as extensive a cure time/temperature in order to fully cure, so processing should be lower cost. Like many amine-cured epoxy formulations, IPDA-Epon 828 is known to be brittle when it does not fully cure, which is one of the reasons why formulators use high levels of plasticizers (benzyl alcohol) with IPDA in room-temperature cure coatings and why IPDA needs to be fully cured in composite applications.

EXAMPLE 1

Synthesis of Aminopropylated Methylene-di-(Cyclohexylamine) (APPACM)

The synthesis of aminopropylated methylene-di-(cyclohexylamine) (APPACM) is a two step process. The first step involves the cyanoethylation of PACM and the second step is the hydrogenation of cyanoethylated PACM to APPACM.

Step 1. PACM (450 g) was charged to a 1 L reactor with 9.0 g of water. The reactor was filled with 50 psig (4.4 atm) nitrogen, stirred for 30 sec and depressurized. This process was repeated 3× to remove all air from the reactor. After the final nitrogen purge, the reactor was filled with a nitrogen atmosphere and 239.6 g of acrylonitrile (ACN) was added using a high pressure liquid pump over 4 hr at 70° C. After the addition was complete the reactor temperature was maintained at 70° C. for an additional 120 min for the reaction to complete to afford di-cyanoethylated PACM.

Step 2: A 1 L Parr pressure reactor was charged with 10 g of isopropanol and 10 g of Raney Cobalt #2724 sponge metal catalyst. The reactor was sealed and pressure cycled 3× with nitrogen to remove air and 3× with hydrogen to remove the nitrogen. The vessel was then heated to 120° C. and pressurized to 800 psig (55.8 atm) with hydrogen. A total of 500 g of di-cyanoethylated PACM from Step 1 was then added to the reactor in 4 hr at 120° C. using a high pressure liquid pump. Afterwards the temperature was increased to 130° C. for an additional 2 hr. After this post hydrogenation period the reactor was depressurized and the product was cooled down to 40° C. and filtered. This product was further processed in a rotary evaporator at 100-120° C. and 30-10 mm Hg to remove isopropanol, light components, and any residual water. The recovered product APPACM contained trace amount of mono-aminopropylated PACM (M-APPACM) and 93.1 wt % bis-aminopropylated PACM (B-APPACM). Table 1 also shows the viscosity, AHEW, amine values and pot life/gel time of the recovered product. The pot life/gel time was run on a 150 g mass comprising the amine curing agent composition mixed stoichiometrically with standard bisphenol-A based epoxy resin (DGEBA, EEW=190) and measured with a Techné gel timer at 25° C.

TABLE 1

| APPACM | |
|---|---|
| | Example 1 |
| Amine used | PACM |
| Amine/ACN ratio (molar) | 2.1/1 |
| Isopropanol (g) | 100 |
| Cyanoethylated Amine quantity (g) | 500 |
| Raney Co #2724 catalyst (g) | 10 |
| % Di-aminopropylated PACM | 93.1 |
| Viscosity at 25° C. (mPa · s) | 520 |
| AHEW | 54 |
| Actual Amine value (mg KOH/g) | 680 |
| Pot life at 25° C. (min) | 103 |

EXAMPLE 2

Synthesis of Isopropylated APPACM at a 2:1 Molar Ratio

A 1 L Parr pressure reactor was charged with 450 g APPACM from Example 1, 1.2 g of 5% Pd/C, 1.2 g 5% Pt/C, 1.2 g sulfided 5% Pt/C catalysts, and 169.4 g of acetone. The reactor was sealed and pressure cycled 3× with nitrogen to remove air and 3× with hydrogen to remove the nitrogen. The vessel was then heated to 80° C. and pressurized to 120 psig (9.2 atm) with hydrogen. After 75 min the temperature was raised to 120° C. and maintained for an additional 2.5 hr. The reactor was depressurized; product was cooled down to 40° C. and filtered. This product was further processed in a rotary evaporator at 100-120° C. and 30-10 mm Hg to remove light components and any residual water.

The recovered product contained trace amount of mono-isopropylated APPACM and 95.4 wt % bis-isopropylated APPACM.

TABLE 2

Isopropylated APPACM

| | Example 2 |
|---|---|
| Amine used | APPACM |
| Alkylating agent | Acetone |
| Degree of Alkylation | 2/1 |
| Amine quantity (g) | 450 |
| Alkylating agent (g) | 169.4 |
| % mono alkylated APPACM | trace |
| % bis alkylated APPACM | 95.4 |
| Viscosity at 25° C. (mPa · s) | 350 |
| AHEW | 102 |
| Actual Amine value (mg KOH/g) | 547 |
| Pot life/gel time at 25° C. (min) | 843 |

EXAMPLES 3-4

Coatings Prepared from isopropylated APPACM-Epoxy Compositions

Table 3 summarizes the amine-epoxy compositions used in Examples 3-4. For instance, the composition of Example 3 was 100 g of Epikote 828 epoxy resin, and 28.4 g of the APPACM curing agent composition of Example 1. As indicated in Table 1, Example 1 was a curing agent composition comprising the reaction product of PACM with acrylonitrile followed by reductive hydrogenation. The curing agents and their respective quantities shown in Examples 3-4 were used as per Tables 3 and 4.

Comparing the viscosities of the products from Tables 1 and 2 it can be seen that the alkylation with acetone reduced the viscosity of the aminopropylated PACM (See Examples 1-2). With regard to pot life, the reaction with acetone increased the pot life by about 8 times.

The DSC results in Table 3 show that the alkylation of APPACM (Ex 2) improves the % of cure after 7 days. it also shows that the aminopropylated PACM (Ex 1) has reach a blocked-stage (no change in % cure from 1 to 7 days). As would be expected the Tg was lower as the molecule is bigger and contains less reactive sites. A flexibilizing effect was encountered.

TABLE 3

| | Example | |
|---|---|---|
| | 3 | 4 |
| Curing agent (Ex) | 1 | 2 |
| Weight Curing agent (g) | 28.4 | 53.6 |
| Resin weight (g) | 100 | 100 |
| Tg through DSC (° C.) init. | 138 | 89 |
| After 1day | 143 | 90 |
| After 7days | 143 | 94 |
| % Cure (DSC) after 1 day | 52 | 44 |
| After 7 days | 52 | 72 |

Drying times for the amine-epoxy coating compositions are summarized in Table 4. The drying time was determined at 23° C. and 65% relative humidity ($R^H$) using a Beck-Koller recorder, in accordance with ASTM D5895. The procedure involved coating glass panels with the amine-epoxy compositions at approximately 6 mils wet film thickness. The selection of a coating composition with either a long or short drying time depends upon the requirements of the end-use application. Generally, the results in Table 4 indicate that the coating of inventive Example 4 dried slower in the thin film which would be expected due to the longer gel time experienced. TFST being Thin Film Set Time which is the time required for the film to harden or set to a hard finish.

Table 4 also list the Persoz Hardness test results after 1 day, 3 days, and 7 days, respectively, at 23° C. and 50% RH. Coatings were applied to glass panels at a wet film thickness of about 8 mils and tested in accordance with ISO 1522.

As shown in Table 4, the formulation of inventive Example 4 having been alkylated had a higher Persoz than the original aminopropylated PACM at 3 and 7 days. Due to the longer gel time the film was not fully cured after one day and it was not possible to measure the Persoz hardness.

Tables 4 lists the 20° Gloss test results after 1 day, 3 days, and 7 days, respectively, at 23° C. and 50% RH. Results shown are the average of 10 measurements. Coatings were applied to glass panels at a wet film thickness of about 8 mils and tested in accordance with ASTM D523. The gloss was measured at an angle of 20° using a Gardner gloss meter. Measurements were made with the glass panel placed on a black cardboard background. As shown in Table 4, the formulation of inventive Example 4 had a much higher gloss value.

TABLE 4

Coating Properties

| | | Example | |
|---|---|---|---|
| | | 3 | 4 |
| Curing agent (Ex) | | 1 | 2 |
| Weight Curing agent (g) | | 28.4 | 53.6 |
| Resin weight (g) | | 100 | 100 |
| TEST @ 25° C. | Phase 1 | 60 | Not visible |
| | Phase 2 | 75 | Not visible |
| | Phase 3 | 180 | 840 |
| | Phase 4 | 240 | >24 hr |
| Persoz Hardness | 1 day | 38 | Not cured |
| | 3 days | 222 | 364 |
| | 7 days | 201 | 375 |
| Gloss after | 1 day | 6 | 143 |
| | 3 days | 6 | 148 |
| | 7 days | 7.7 | 155 |

The mechanical properties of the epoxy coating systems were also tested. The results are collected in Table 5. The tests were all performed using Instron instruments of 5500 series. Examples 3 and 4 were cured 7 days at room temperature (23-25° C.) while Examples 4A (same as Ex 4 but different cure schedule) and PACM were cured 5 hours at 80° C. All the test specimens were stored for least 24 hours at 23+/−2° C. and 50+/−2% relative humidity before being tested.

The tensile properties were determined according to ASTM D-638. The tensile crosshead speed was set at 0.2 inch/minute on the Instron model 4505. The flexural properties were determined according to ASTM D-790 three point test method. The specimen span was 2 inches, the cross head speed was set at 0.05 inch/minute on the Instron model 4505. The compressive properties were determined according to ASTM D-695. The cross head speed was set at 0.05 inch/minute on the Instron Model 4505.

The heat curing of the systems improved the % elongation at break, as well as the tensile and flexural properties, however the compressive properties were a bit better with room temperature cure. Alkylation does not increase the mechanical properties of the epoxy systems. This is understandable since the cross linking density will be decreased by the alkylation. The values measured were still good enough for most applications.

TABLE 5

Mechanical properties

| | Example | | | |
|---|---|---|---|---|
| | 3 | 4 | 4A | PACM |
| Tensile Elongation at max load (%) | 1.5 | | 5.3 | 5.4 |
| Tensile Elongation at break (%) | 1.5 | | 7.6 | 5.4 |
| Tensile Stress at max load (Mpa) | 50.6 | | 60.4 | 71.4 |
| Tensile Stress at break (Mpa) | 50.6 | | 58.6 | 71.4 |
| Tensile Modulus (Mpa) | 4195.6 | | 2375 | 2443 |
| Flexural Strength at yield (Mpa) | 84.4 | | 98.8 | 122 |
| Flexural Modulus (Mpa) | 2922.1 | | 2161 | 2231 |
| Compressive Stress (Mpa) | 102.7 | 91.0 | 69.8 | 121 |
| Compressive Modulus (Mpa) | 2778.7 | 2647.7 | 1742 | 1632 |

The lap shear properties were determined according to ASTM D-1002. The lap shear cross head speed was set at 0.05 inch/min. Specimens were cured 7 days at 25° C. and 60 RH. The alkylation of the aminopropylated PACM showed an important improvement on the lap shear strength of the epoxy coating system, as demonstrated by the results in Table 6.

TABLE 6

Lap shear

| | Example | |
|---|---|---|
| | 3 | 4 |
| Bond strength (Mpa) | 2.5 | 11.4 |
| Load at maxload (N) | 811.8 | 3686.5 |

We claim:

1. A curing agent composition comprising at least one alkylated aminopropylated methylene-di-(cyclohexylamine) having at least three active amine hydrogen atoms; wherein the at least one alkylated aminopropylated methylene-di-(cyclohexylamine) comprises: a methylene-di-(cyclohexylamine) structure having two nitrogen atoms; at least one aminopropyl group bonded to at least one of the two nitrogen atoms of the methylene-di-(cyclohexylamine) structure; and at least one C2-C21 alkyl group bonded to the nitrogen atom of at least one aminopropyl group of the at least one aminopropyl group bonded to at least one of the two nitrogen atoms of the methylene-di-(cyclohexylamine) structure.

2. The curing agent composition of claim 1 further comprising at least one multifunctional amine having 3 or more active amine hydrogens.

3. The composition of claim 2, wherein the at least one multifunctional amine is an aliphatic amine, a cycloaliphatic amine, an aromatic amine, a poly(alkylene oxide) diamine or triamine, a Mannich base derivative of an aliphatic amine, a cycloaliphatic amine, or an aromatic amine, a polyamide derivative of an aliphatic amine, a cycloaliphatic amine, or an aromatic amine with a dimmer fatty acid or a mixture of a dimmer fatty acid and fatty acid, an amidoamine derivative of an aliphatic amine, a cycloaliphatic amine, or an aromatic amine with a fatty acid, an amine adduct derivative of an aliphatic amine, a cycloaliphatic amine, or an aromatic amine with a glycidyl ether of bisphenol A or bisphenol F or an epoxy novolac resin, or any combination thereof.

4. The composition of claim 2, wherein the at least one multifunctional amine is ethylenediamine (EDA), diethylenetriamine (DETA), triethylenetetramine (TETA), tetraethylenepentamine (TEPA), pentaethylenehexamine (PEHA), propylenediamine, dipropylenetriamine, tripropylenetetramine, N-3-aminopropyl ethylenediamine (Am3), N,N'-bis(3-aminopropyl)ethylenediamine (Am4), N,N,N'-tris(3-aminopropyl)ethylenediamine (Am5); N-3-aminopropyl-1,3-diaminopropane, N,N'-bis(3-aminopropyl)-1,3-diaminopropane, N,N,N'-tris(3-aminopropyl)-1,3-diaminopropane, or any combination thereof.

5. The composition of claim 1, wherein the at least one alkylated aminopropylated methylene-di-(cyclohexylamine) comprises the reductive amination product of an aldehyde or ketone compound with at least one aminopropylated methylene-di-(cyclohexylamine).

6. The composition of claim 5, wherein the at least one aminopropylated methylene-di-(cyclohexylamine) compound is N-(3-aminopropyl)methylene-di-(cyclohexylamine); N,N'-bis(3-aminopropyl)methylene-di-(cyclohexylamine); N,N-bis(3-aminopropyl)methylene-di-(cyclohexylamine); N,N,N'-tris(3-aminopropyl)methylene-di-(cyclohexylamine); or any combination thereof.

7. The composition of claim 3, wherein the at least one aminopropylated methylene-di-(cyclohexylamine) compound is N,N'-bis(3-aminopropyl)methylene-di-(cyclohexylamine).

8. The composition of claim 5, wherein the molar reactant ratio of the aldehyde or ketone compound to the at least one aminopropylated methylene-di-(cyclohexylamine) compound is in a range from about 0.8:1 to about 2:1.

9. The composition of claim 5, wherein the molar reactant ratio of the aldehyde or ketone compound to the at least one aminopropylated methylene-di-(cyclohexylamine) compound is in a range from about 1.2:1 to about 1.5:1.

10. The composition of claim 1, wherein the curing agent composition has an amine hydrogen equivalent weight (AHEW) based on 100% solids from about 50 to about 500.

11. The composition of claim 1, wherein the curing agent composition has an AHEW based on 100% solids from about 100 to about 200.

12. An amine-epoxy composition comprising the reaction product of:
A) ring agent composition of claim 1; and
B) an epoxy composition comprising at least one multifunctional epoxy resin.

13. The amine-epoxy composition of claim 12 in which the curing agent composition comprises the contact product of a curing agent composition of claim 1 and at least one multi-functional amine having 3 or more active amine hydrogens.

14. The composition of claim 12, wherein the stoichiometric ratio of epoxy groups in the epoxy composition to amine hydrogens in the curing agent composition is in a range from about 1.3:1 to about 0.7:1.

15. An article of manufacture comprising the composition of claim 12.

16. The article of claim 15, wherein the article is an adhesive, a coating, a primer, a sealant, a curing compound, a construction product, a flooring product, or a composite product.

17. The article of claim 15, wherein the article is a coating, primer, sealant, or curing compound which is applied to a metal or cementitious substrate.

18. A curing agent composition comprising at least one alkylated aminopropylated methylene-di-(cyclohexylamine) having at least three active amine hydrogen atoms; wherein the at least one alkylated aminopropylated methylene-di-(cyclohexylamine) has the formula:

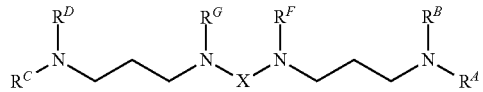

wherein $R^A$ is a C2-C11 alkyl group; $R^B$, $R^C$, $R^D$, $R^F$, and $R^G$ are independently $R^A$ or a hydrogen atom; and X is a methylene-di-(cyclohexyl) group.

19. The composition of claim 18 wherein $R^A$ and $R^C$ are C2-C11 alkyl; $R^B$, $R^D$, $R^F$, and $R^G$ are hydrogen atoms.

20. The composition of claim 18, wherein $R^A$ and $R^C$ are C3-C8 alkyl; $R^B$, $R^D$, $R^F$, and $R^G$ are hydrogen atoms.

21. The composition of claim 18, wherein $R^A$ and $R^C$ are C3-C6 alkyl; $R^B$, $R^D$, $R^F$, and $R^G$ are hydrogen atoms.

22. An amine-epoxy composition comprising the reaction product of:

A) a curing agent composition of claim 18; and

B) an epoxy composition comprising at least one multi-functional epoxy resin.

23. An article of manufacture comprising the composition of claim 22.

* * * * *

UNITED STATES PATENT AND TRADEMARK OFFICE
CERTIFICATE OF CORRECTION

| | | |
|---|---|---|
| PATENT NO. | : 7,993,751 B2 | Page 1 of 1 |
| APPLICATION NO. | : 12/186607 | |
| DATED | : August 9, 2011 | |
| INVENTOR(S) | : Gamini Ananda Vedage, Williams Rene Raymond and Maw Lin Foo | |

It is certified that error appears in the above-identified patent and that said Letters Patent is hereby corrected as shown below:

Column 18, Line 63
In Claim 12 A) delete "ring" and insert the words -- a curing --

Signed and Sealed this
Eighth Day of November, 2011

David J. Kappos
*Director of the United States Patent and Trademark Office*